United States Patent
Aoyagi

(10) Patent No.: US 8,169,359 B2
(45) Date of Patent: May 1, 2012

(54) PULSE DOPPLER RADAR DEVICE

(75) Inventor: Yasushi Aoyagi, Tokyo (JP)

(73) Assignee: The Furukawa Electric Co., Ltd, Tokyo (JP)

( * ) Notice: Subject to any disclaimer, the term of this patent is extended or adjusted under 35 U.S.C. 154(b) by 302 days.

(21) Appl. No.: 12/437,833

(22) Filed: May 8, 2009

(65) Prior Publication Data

US 2009/0284407 A1 Nov. 19, 2009

(30) Foreign Application Priority Data

May 15, 2008 (JP) .................................. 2008-128093

(51) Int. Cl.
*G01S 13/58* (2006.01)
*G01S 13/18* (2006.01)
*G01S 13/93* (2006.01)
*G01S 13/00* (2006.01)

(52) U.S. Cl. ............... 342/109; 342/21; 342/27; 342/28; 342/70; 342/89; 342/91; 342/94; 342/104; 342/118; 342/134; 342/135; 342/175; 342/192; 342/194; 342/195; 342/196

(58) Field of Classification Search ..................... 342/21, 342/27, 28, 70–72, 118, 127–145, 175, 192–197, 342/73, 89, 94–97, 104–115, 90–93
See application file for complete search history.

(56) References Cited

U.S. PATENT DOCUMENTS

| | | | | |
|---|---|---|---|---|
| 3,768,097 A | * | 10/1973 | Ziegler | 342/136 |
| 3,798,643 A | * | 3/1974 | Blore et al. | 342/104 |
| 3,898,653 A | * | 8/1975 | Ban et al. | 342/109 |
| 4,219,812 A | * | 8/1980 | Rittenbach | 342/110 |
| 4,377,811 A | * | 3/1983 | Mooney et al. | 342/94 |
| 4,450,445 A | * | 5/1984 | Conner et al. | 342/104 |

(Continued)

FOREIGN PATENT DOCUMENTS

JP 06-73912 U 10/1994

(Continued)

OTHER PUBLICATIONS

European Search Report dated Jul. 27, 2011 for EP Application No. 09159791.4, 5 pages.

(Continued)

*Primary Examiner* — Bernarr Gregory
(74) *Attorney, Agent, or Firm* — Turocy & Watson, LLP

(57) ABSTRACT

A judging and controlling part 110 comprises an operation mode judging unit 111, a pulse width selecting unit 112, and a band limiting width selecting unit 113, wherein the operation mode judging unit 111 receives a signal of a gear state from a predetermined controlling device in a vehicle, and then judges the operation mode thereof. Based on a result of the judgment at the operation mode judging unit 111, the pulse width selecting unit 112 and the band limiting width selecting unit 113 control a wide band impulse generating part 120 and a band width limiting part 150, respectively.

4 Claims, 11 Drawing Sheets

U.S. PATENT DOCUMENTS

| | | | | |
|---|---|---|---|---|
| 4,454,511 | A | * | 6/1984 | Peters ............................ 342/89 |
| 4,622,556 | A | * | 11/1986 | Bryant et al. ................. 342/196 |
| 4,672,380 | A | * | 6/1987 | Bryant et al. ................. 342/195 |
| 4,816,833 | A | * | 3/1989 | Ferguson et al. .............. 342/95 |
| 5,150,126 | A | * | 9/1992 | Knepper et al. ............. 342/137 |
| 5,311,189 | A | * | 5/1994 | Nagel ............................ 342/95 |
| 5,694,130 | A | | 12/1997 | Suzuki et al. |
| 5,966,090 | A | * | 10/1999 | McEwan ........................ 342/27 |
| 5,977,905 | A | * | 11/1999 | Le Chevalier ................ 342/196 |
| 6,078,281 | A | * | 6/2000 | Milkovich et al. ............ 342/196 |
| 6,111,537 | A | * | 8/2000 | Andersson .................... 342/137 |
| 6,384,768 | B1 | * | 5/2002 | Kai ................................ 342/70 |
| 6,426,716 | B1 | * | 7/2002 | McEwan ........................ 342/28 |
| 6,788,246 | B2 | * | 9/2004 | Uehara .......................... 342/70 |
| 6,906,661 | B2 | * | 6/2005 | Sawamoto et al. ............ 342/70 |
| 7,053,816 | B2 | * | 5/2006 | Kai ................................ 342/70 |
| 7,864,106 | B2 | * | 1/2011 | Beilin et al. .................. 342/137 |
| 2004/0066322 | A1 | * | 4/2004 | Uehara .......................... 342/70 |
| 2005/0168377 | A1 | * | 8/2005 | Kai ................................ 342/70 |

FOREIGN PATENT DOCUMENTS

| | | |
|---|---|---|
| JP | 10-039000 A | 2/1998 |
| JP | 10-186032 | 7/1998 |
| JP | 11-223673 | 8/1999 |
| JP | 2007-3290 A | 1/2007 |
| JP | 2007-022280 | 2/2007 |
| WO | 2009/016459 A2 | 2/2009 |

OTHER PUBLICATIONS

JP Office Action dated Mar. 4, 2011 for Japanese Patent Application No. 2010-073222 (Divisional of No. 2008-128093 corresponding to U.S. Appl. No. 12/437,833—untranslated).

* cited by examiner

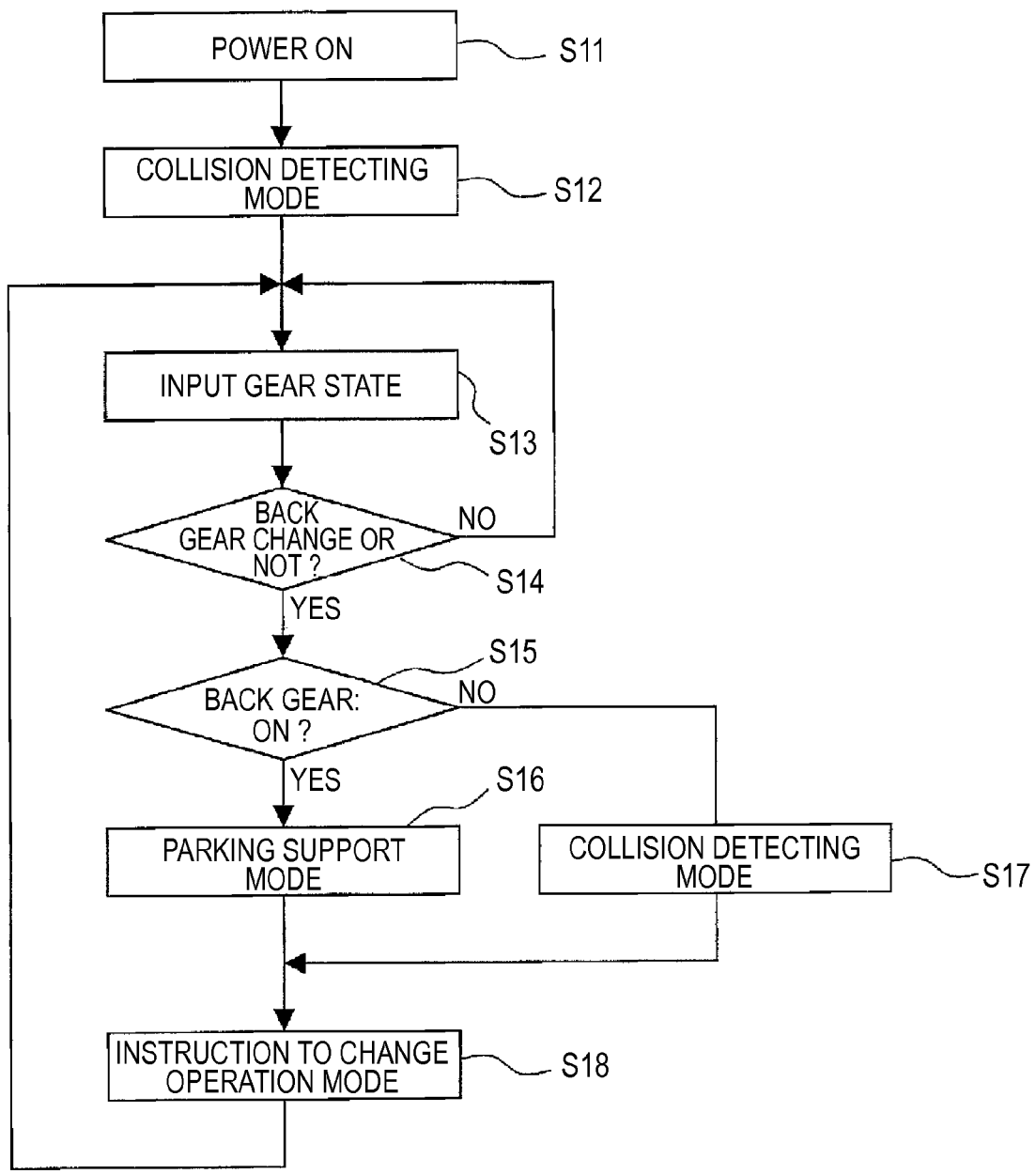

FIG.4(a) SEED PULSE SIGNAL
(BACK GEAR: ON)
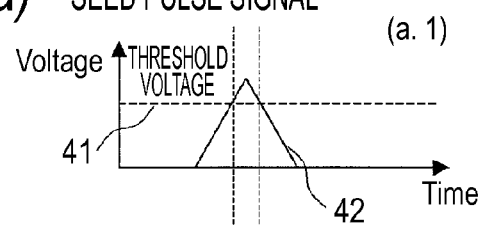
(a.1)
(BACK GEAR: OFF)
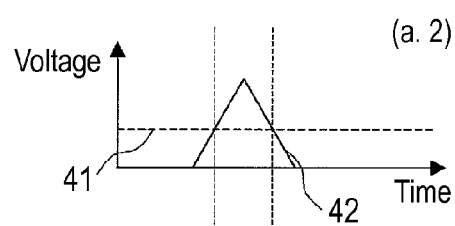
(a.2)
FIG.4(b) PULSE SIGNAL
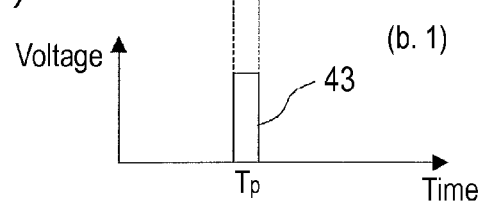
(b.1)
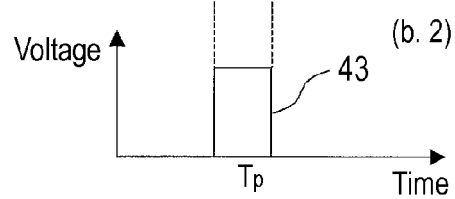
(b.2)
FIG.4(c) PULSE SIGNAL (SPECTRUM)
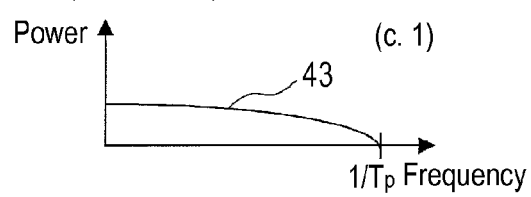
(c.1)
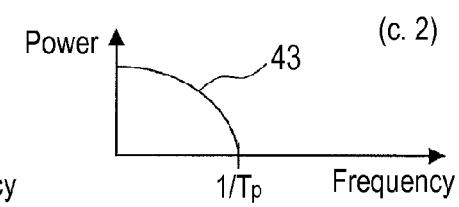
(c.2)

PULSE DOPPLER RADAR DEVICE

CROSS-REFERENCE TO RELATED APPLICATIONS

This application claims priority to Japanese patent application serial No. 2008-128093, filed on May 15, 2008, the entire content of which is incorporated herein by reference.

BACKGROUND OF THE INVENTION

1. Field of the Invention

The present invention relates to a pulse Doppler radar device for detecting a range to an object in vicinity and a relative velocity of the object at the same time. And in particular, the present invention relates to a pulse Doppler radar device making use of a pulse with an ultra wideband.

2. Description of the Related Art

Conventionally, as a pulse Doppler radar device for vehicle for detecting a range to and a relative velocity of an object, there is known a type as disclosed in a Patent Reference 1 for example. The pulse Doppler radar device for vehicle as disclosed in the Patent Reference 1 emits a pulse, and then receives a reflected wave, which is reflected by an object.

The reflected wave, which is received thereat, is sampled for each of range gates (or range bins). The sampled data is presum-processed, and then the presum-processed data is subjected to an FFT (a fast Fourier transform) processing. In the FFT processing, a frequency analysis is performed for a signal at each of the range gates, and then an amplitude output is evaluated for each of frequency gates. Further, after performing such processing, a range to an object is evaluated based on the range gate at which the signal is detected, and also a relative velocity of the object detected at the range gate is evaluated as well based on the frequency gate at which the signal is detected. Furthermore, the Patent Reference 1 proposes performing a presum-processing over a plurality of range gates in a receiving circuit in order to improve an S/N (signal to noise) ratio.

Patent Reference 1: Japanese Patent Application Publication No. 2004-125591

However, the operation mode of a radar device for vehicle includes a case where the radar device is used in a period of running at high speed, such as a collision detecting radar or the like, and a case where the radar device is used in a period of running at lower speed, such as a parking support radar or the like. And then an operating condition required, such as a range resolution, a measuring range (ranging area), a measuring cycle (data renewal cycle), or the like, is different for each case. In the former case of the collision detecting radar or the like, the range resolution may be as rough as several tens centimeters approximately, however, there is a requirement for detecting an object having a large relative velocity of up to approximately 200 km/h within a ranging area. On the other hand, in the latter case of the parking support radar or the like, the range resolution should be finer than 10 cm for example, however, it is sufficient if it is possible to detect an object having a relative velocity not larger than 20 km/h for example.

Moreover, a data renewal cycle (measuring cycle) required for notifying a result of a radar detection to a crew is different depending on the operation modes. That is, in the former operation mode of the collision detecting radar or the like, because the relative velocity to an object is large, the measuring cycle needs to be as short as approximately 10 ms for example. On the other hand, in the later operation mode of the parking support radar or the like, the measuring cycle may be about ten times as long as that in the former case because the relative velocity of the object is smaller.

Thus, it has been necessary to install separate radar devices corresponding to different operation modes. However, installing a plurality of radar devices requires an excessively large installation space, which makes it difficult to install the radar devices and makes the system costly.

The present invention is made to solve the above mentioned problems. It is an object of the present invention to provide a pulse Doppler radar device which is capable of automatically judging a change of the operation mode and switching an operating condition.

SUMMARY OF THE INVENTION

According to an aspect of the present invention, there is provided a pulse Doppler radar device, comprising: a judging and controlling part for receiving a predetermined judgment reference data and judging an operation mode; a wide band impulse generating part including a pulse width setting unit for setting a bandwidth of a pulse to be generated based on a result of the judgment of the operation mode, a seed pulse generating unit for generating a seed pulse, and an impulse generating unit for generating a pulse having a bandwidth set by the pulse width setting unit using the seed pulse; a pulse Doppler transmitting and receiving part for transmitting outside the pulse generated in the wide band impulse generating part as a transmitting pulse, receiving a reflected pulse reflected by an object and returned therefrom, and outputting quadrature phase I and Q signals by performing a quadrature phase detection for the reflected pulse using a carrier wave of the transmitting pulse; a range gate setting part for determining a timing for sampling the quadrature phase I and Q signals based on a delay time for each of range gates from the generation of the seed pulse, and outputting a range gate signal with the timing; a bandwidth limiting part for receiving the quadrature phase I and Q signals from the pulse Doppler transmitting and receiving part, and limiting the quadrature phase I and Q signals within a band limiting width set based on the result of the judgment of the operation mode; an A/D-converting part for receiving the quadrature phase I and Q signals from the bandwidth limiting part, and A/D-converting the quadrature phase I and Q signals with the timing with which the range gate signal is input from the range gate setting part; a presum part for receiving a digital value for each of the A/D-converted quadrature phase I and Q signals from the A/D-converting part, and outputting integrated I and Q signals by integrating the digital values for each of the quadrature phase I and Q signals by a predetermined number of times; and an instruction executing part for determining the delay time for each of the range gates and outputting the delay time to the range gate setting part, receiving the integrated I and Q signals from the presum part, performing a frequency analysis for all of the range gates to calculate an amplitude output for each of the range gates and an amplitude output for each of frequency gates, judging whether there is or not an object by comparing the amplitude output for each of the range gates and the amplitude output for each of the frequency gates with a predetermined threshold, and calculating a range to and a relative velocity of the object based on the range gate and the frequency gate where the object is detected.

The above and other objects features, advantages and technical and industrial significance of this invention will be better understood by reading the following detailed description of presently preferred embodiments of the invention, when in connection with the accompanying drawings.

BRIEF DESCRIPTION OF THE DRAWINGS

FIG. 3 is a flow chart showing a process of judging an operation mode at an operation mode judging unit in the first embodiment;

FIG. 4 is a schematic diagram for explaining a method of generating an impulse signal for transmitting at a wide band impulse generating part in the first embodiment;

DETAILED DESCRIPTION OF THE PREFERRED EMBODIMENTS

The First Embodiment

A preferred embodiment of a pulse Doppler radar device according to the present invention will be described in detail below, with reference to the drawings. Here, each of component parts having a similar function is designated by the similar symbol for simplifying a drawing and a description. In the following, the description is given to a case where the pulse Doppler radar device according to the present invention is used with being mounted in a vehicle, for example.

The pulse Doppler radar device according to the first embodiment of the present invention realizes an operation mode of such as a collision detecting or the like, in which objects having a large relative velocity are detected with a relatively low range resolution, and another operation mode of such as a parking support or the like, in which objects having a small relative velocity are detected with a relatively high range resolution. First, an operating condition required for each of the operation modes will be described in detail below.

Figure 2:
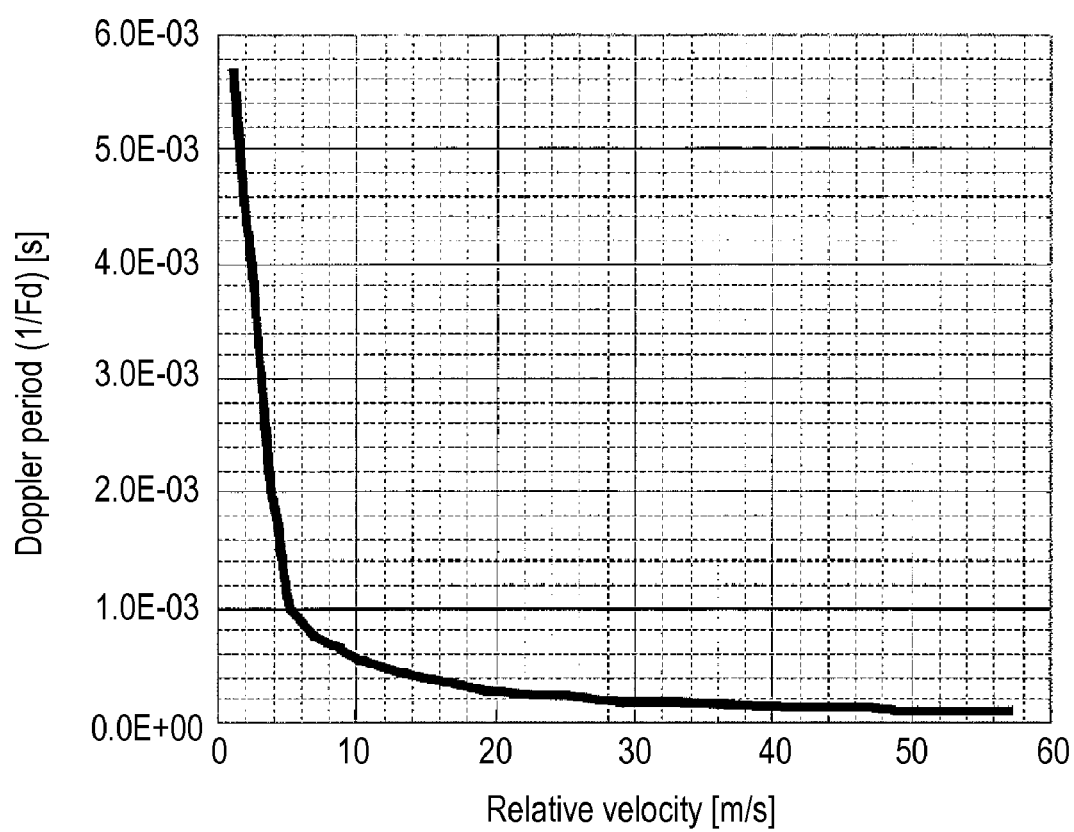
FIG. 2 is a graph showing a relation between a Doppler period and a relative velocity.

When an object moving with a relative velocity v is detected using an RF signal having a center frequency $F_c$, a Doppler frequency $F_d$ is given by the following equation:

$$F_d = 2vF_c/c,$$

where c is the velocity of light. In a pulse Doppler radar, $F_d$ is estimated by frequency-analyzing sampled data at a predetermined range gate. Here, a Doppler period is $1/F_d$. FIG. 2 shows a relation between the Doppler period and a relative velocity of an object, where the center frequency $F_c$ is assumed to be 26.5 (GHz), and the velocity of light c is assumed to be $3 \times 10^8$ (m/s). In order to estimate the Doppler frequency by performing an FFT processing as a method of frequency analysis, it is necessary to observe a range gate over at least one Doppler period.

First, a case where an object having a low relative velocity needs to be detected with a high range resolution will be described in detail below. As one example, the relative velocity of the object is assumed to be 1 (m/s) (=3.6 (km/h)), and the range resolution required therefor is assumed to be 0.075 (m). In this case, by substituting the relative velocity of 1 (m/s) into the above equation, the Doppler period of 5.67 (ms) is obtained. Because the Doppler period becomes longer as the relative velocity becomes smaller (see FIG. 2), it is necessary to set an observing cycle Ts for each range gate long when observing an object having a small relative velocity.

Next, a case of observing an object having a large relative velocity will be described in detail below. As one example, considering a case where the range resolution and the observing cycle Ts are 0.075 (m) and 5.67 (ms), respectively, which are the same values as above mentioned, and where an object having the relative velocity v of 200 (km/h) is observed, then a moving distance of the object $L_s$ during one observing cycle $T_s$ is calculated by the following equation:

$$L_s = (200 \times 10^3 / 3600) \times 0.00567$$
$$= 0.315 \text{ (m)}.$$

The object moves by not shorter than 0.3 m during an observing cycle $T_s$ of one range gate. On the contrary, a distance corresponding to one range gate (a range resolution) is set to 0.075 (m). Therefore, it is probable that a signal of the object detected in one of the range gates is decreased to not larger than one fourth thereof and buried below a noise level.

Moreover, in the case where the range gates are set by the above mentioned unit of 0.075 (m), a period of time required for measuring over a predetermined ranging area, that is to say, a measuring cycle (data renewal cycle) $T_m$ is calculated as follows:

$$T_m = T_s \times \text{int}[(R_{max} - R_{min})/R_{step}],$$

where $R_{max}$ denotes a maximum measuring range, $R_{min}$ denotes a minimum measuring range, $R_{step}$ denotes a range resolution (or a distance per range gate), and 'int[ ]' denotes an operator for rounding off fractions. Substituting $T_s$=5.67 (ms), $R_{max}$=10 (m), $R_{min}$=0.1 (m), and $R_{step}$=0.075 (m) into the above equation, a measuring cycle $T_m$=748 (ms) is obtained.

As described above, it is necessary to set the measuring cycle $T_m$ excessively long in order to observe over the ranging area of 10 m with the range gates set by the unit of 0.075 (m). However, such a long measuring cycle is undesirable for a collision detecting radar and for a parking support radar as well. Hence, in a case where the range resolution is set small, it is necessary to set the maximum measuring range $R_{max}$ small as well. On the contrary, it is necessary to set the range resolution $R_{step}$ large in a case where the maximum measuring range $R_{max}$ is set long. In particular, for the purpose of detecting an object with a large relative velocity, it is preferable to set the range resolution $R_{step}$ large in order to shorten the measuring cycle.

As described above, the operating conditions of the ranging area ($R_{max}$), the range resolution ($R_{step}$), the observing cycle ($T_s$) for each range gate, which corresponds to the resolution of the relative velocity, and the measuring cycle ($T_m$) are relating to one another. Accordingly, it is necessary to properly set each of those conditions in accordance with the operation mode required. The pulse Doppler radar device according to the present embodiment is configured to receive a predetermined judgment reference data from a vehicle and to determine an operation mode, and then to determine each of the operating conditions of the pulse Doppler radar device in accordance with the operation mode determined.

Moreover, the pulse Doppler radar device according to the present embodiment is configured to change a pulse width of an impulse sent out therefrom in accordance with a range resolution. Because the range resolution with which a range is measurable using an impulse is determined by $T_p \times c/2$, where $T_p$ denotes a pulse width, and c denotes the velocity of light, it is desirable to send an ultra wideband impulse with a small pulse width in a case where a high range resolution is required, such as a case of a parking support radar or the like. For example, for realizing the above mentioned parking support radar, the pulse width $T_p$ may be set approximately to 0.5 ns (2 GHz), with which a range is measurable with the range resolution of 0.075 m.

On the other hand, in a case where the range resolution may be low, such as a case of a collision detecting radar or the like, a narrow band impulse of a large pulse width is output. By setting the pulse width wide in accordance with the range resolution, it becomes possible to perform measurement without any dead zone. For example, for realizing the above mentioned collision detecting radar, the pulse width $T_p$ may be set approximately to 2 ns (0.5 GHz), with which a range is measurable with a range resolution of 0.3 m. Moreover, narrowing the bandwidth as such is helpful for suppressing an occupied bandwidth, thereby reducing an interference with other system or the like.

Figure 1:
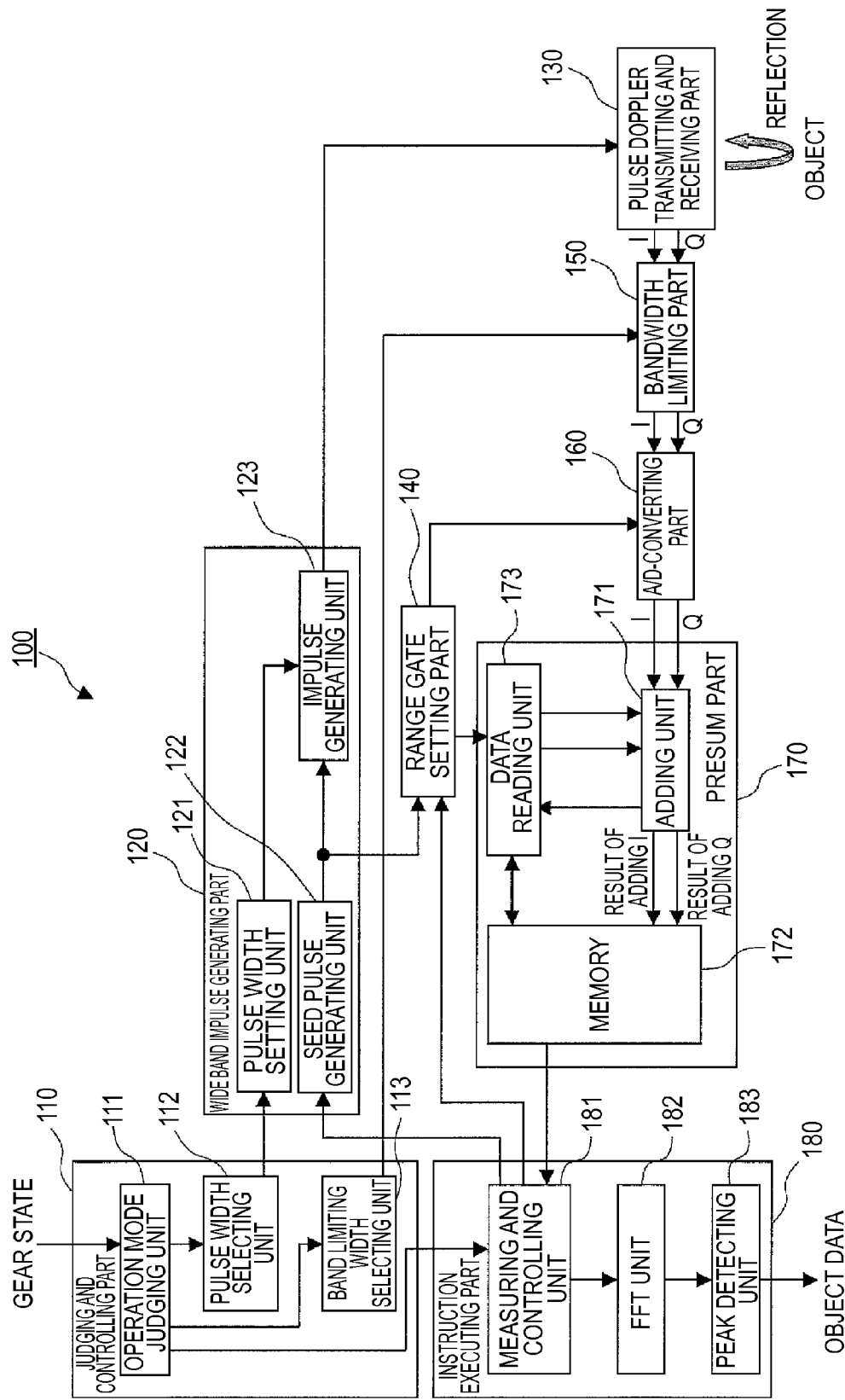
FIG. 1 is a block diagram showing a configuration of a pulse Doppler radar device according to the first embodiment of the present invention.

The pulse Doppler radar device according to the present embodiment will be described in detail below, with reference to the block diagram shown in FIG. 1. A pulse Doppler radar device 100 according to the present embodiment is configured to automatically judge and switch between an operation mode as the collision detecting radar required when the relative velocity is large and another operation mode as the parking support radar adopted when the relative velocity is small.

According to the present embodiment, for the purpose of judging the above mentioned operation modes, a gear information is input from a predetermined controlling device in the vehicle. The gear information is used to automatically select either one of the operation mode as the collision detecting radar or the operation mode as the parking support radar. When the operation mode as the collision detecting radar is selected, each of the operating conditions is set so as for the radar to be able to measure an object of a large velocity existing within a predetermined ranging area. On the other hand, when the operation mode as the parking support radar is selected, each of the operating conditions is set so as for the radar to be able to measure an object of a small velocity with a higher range resolution.

Still further, according to the present embodiment, when the operation mode as the parking support radar in which the measurement with higher range resolution is required is selected, the impulse of ultra wideband is sent out therefrom to perform measurement, and when the operation mode as the collision detecting radar in which the range resolution may be lower is selected, the impulse of the narrow band is sent out therefrom to perform measurement. By configuring the radar in such a way, it becomes possible to realize a high range resolution when used as a parking support radar, and to realize the measurement without dead zone when used as a collision detecting radar.

The pulse Doppler radar device 100 according to the present embodiment comprises a judging and controlling part 110 for judging an operation mode thereof and performing a predetermined controlling therefor, a wide band impulse generating part 120 for generating an impulse signal having a bandwidth set based on a result of the judgment of the operation mode, a pulse Doppler transmitting and receiving part 130 for sending out the impulse signal as a transmitting pulse and receiving and processing a reflected pulse reflected by an object and returned therefrom, a range gate setting part 140 for processing the received signal, a bandwidth limiting part 150, an A/D-converting part 160, a presum part 170, and an instruction executing part 180.

The judging and controlling part 110 comprises an operation mode judging unit 111, a pulse width selecting unit 112, and a band limiting width selecting unit 113, wherein the operation mode judging unit 111 receives a signal of a gear state from a predetermined controlling device (not shown in the figures) in a vehicle, and then judges the operation mode of the radar device. Further, based on a result of the judgment at the operation mode judging unit 111, the pulse width selecting unit 112 and the band limiting width selecting unit 113 control the wide band impulse generating part 120 and the bandwidth limiting part 150, respectively. Still further, the operation mode judging unit 111 instructs the instruction executing part 180 to initialize an instruction execution process when a change of the operation mode is judged.

The wide band impulse generating part 120 comprises a pulse width setting unit 121, a seed pulse generating unit 122, and an impulse generating unit 123, and generates an impulse signal with a predetermined pulse width.

The pulse Doppler transmitting and receiving part 130 receives the impulse signal from the wide band impulse generating part 120, and then sends out a transmitting pulse outside. The pulse Doppler transmitting and receiving part 130 receives a reflected pulse reflected by an object and returned therefrom, performs a quadrature phase detection for the reflected pulse using a carrier wave of the transmitting pulse, and then outputs an I signal and a Q signal.

The range gate setting part 140 outputs a signal (a range gate signal) for instructing a timing of sampling the quadrature phase I and Q signals, which are output from the pulse Doppler transmitting and receiving part 130, for each of the range gates, with reference to a timing with which the seed pulse is generated at the seed pulse generating unit 122.

The bandwidth limiting part 150 limits a passing band for the quadrature phase I and Q signals, which are output from the pulse Doppler transmitting and receiving part 130.

The A/D-converting part 160 A/D-converts the I and the Q signals which are output from the bandwidth limiting part 150, with a timing with which the range gate signal is input from the range gate setting part 140.

The presum part 170 comprises a adding unit 171, a memory 172 and a data readout unit 173. The presum part 170 integrates the sampled values of the I and the Q signals which are converted into the digital data at the A/D converting part 160 by a predetermined number of times, and outputs the presum data.

The instruction executing part 180 comprises a measuring and controlling unit 181, an FFT unit 182 and a peak detecting unit 183. The measuring and controlling unit 181 controls a generation of seed pulses and a signal-processing of received pulses. Furthermore, when receiving an instruction to initialize the instruction execution process from the judging and controlling part 110, the instruction executing part 180 initializes a range gate counter and a pulse transmitting counter, and commences a measurement as a collision detecting radar or as a parking support radar.

Next, signal processing in each of the component parts of the pulse Doppler radar device 100 according to the present embodiment will be described in further detail below.

First, in the judging and controlling part 110, the operation mode judging unit 111 receives a signal of a gear state as a judgment reference data from a predetermined controlling device (not shown in the figures) in the vehicle. With reference to such signal, the operation mode judging unit 111 judges whether to use the pulse Doppler radar device 100 as the collision detecting radar (referred to as a collision detecting mode hereinafter), or to use the same as the parking support radar (referred to as a parking support mode hereinafter). A process of judging an operation mode at the operation mode judging unit 111 will be described in detail below with reference to FIG. 3. FIG. 3 is a flow chart showing a process of judging an operation mode at the operation mode judging unit 111.

In FIG. 3, when an electric power source of the vehicle is turned on (step S11), the collision detecting mode is set as an initial operation mode for the pulse Doppler radar device 100 (step S12). Thereafter, the following steps are performed cyclically. The operation mode judging unit 111 receives a signal of a gear state from a predetermined controlling device (step S13). Then, a judgment whether the state of a back gear is changed or not (ON/OFF) is made (step S14). In a case where the state of the back gear has not been changed, the signal processing of the steps S13 and S14 are performed again in a next observing cycle.

On the other hand, in a case where the state of the back gear is judged to have been changed in the step S14, a judgment whether the state of the back gear is ON or OFF is made in the step S15. Then in a case where the back gear is ON, the parking support mode is selected (step S16). Meanwhile, in a case where the back gear is OFF, the collision detecting mode is selected (step S17). In the step S18, an operation mode selected is output to the pulse width selecting unit 112 and the band limiting width selecting unit 113 as an instruction at the time of change of the operation mode. Further, the operation mode judging unit 111 instructs the instruction executing part 180 to initialize the instruction executing process.

The pulse width selecting unit 112, when receiving an operation mode data from the operation mode judging unit 111, outputs a pulse width instruction value (or a bandwidth instruction value) corresponding to the operation mode to the pulse width setting unit 121. That is to say, when the collision detecting mode data is received from the operation mode judging unit 111, an instruction value to generate an impulse signal having a wide pulse width is output to the pulse width setting unit 121. Meanwhile, when the parking support mode data is received from the operation mode judging unit 111, an instruction value to generate an impulse signal having a narrow pulse width is output to the pulse width setting unit 121.

The instruction value output to the pulse width setting unit 121 from the pulse width selecting unit 112 may be a digital value which corresponds to a threshold voltage 41 as shown in FIG. 4(*a*). Such a digital value is used for determining a pulse width of an impulse signal generated at the wide band impulse generating part 120, i.e., the digital value is set larger to narrow the pulse width (FIG. 4(*a*. 1)), while the digital value is set smaller to widen the pulse width (FIG. 4(*a*. 2)).

The band limiting width selecting unit 113 outputs a band limiting width to the bandwidth limiting part 150 for limiting a passing band of the received wave in accordance with a band of the pulse generated at the wide band impulse generating part 120, based on the instruction to operate either in the collision detecting mode or in the parking support mode, which is input from the operation mode judging unit 111.

Figure 5:
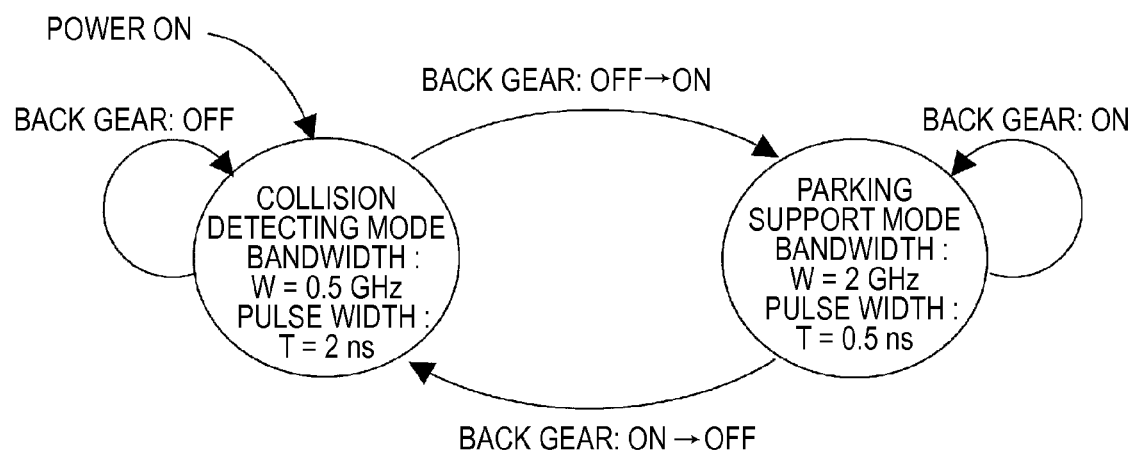
FIG. 5 is a state transition diagram explaining an operation performed at a judging and controlling part in the first embodiment.

The operation of the judging and controlling part 110 is shown in a state transition diagram of FIG. 5. According to the state transition diagram as shown in FIG. 5, the collision detecting mode is continued during a period of time where the back gear is OFF, and the parking support mode is continued during a period of time where the back gear is ON. Moreover, the operation mode is switched from the collision detecting mode to the parking support mode when the back gear is switched from OFF state to ON state. On the contrary, the operation mode is switched from the parking support mode to the collision detecting mode when the back gear is switched from ON state to OFF state.

When using the radar in the collision detecting mode, the pulse width is selected wider (2 ns, for example) by setting the bandwidth of the pulse signal to a narrower bandwidth (0.5 GHz for example), in order to make the range resolution lower. On the other hand, when using the radar in the parking support mode, the pulse width is selected narrower (0.5 ns for example) by setting the bandwidth of the pulse signal to a wider bandwidth (2 GHz for example), in order to make the range resolution higher.

Next, the operation of the wide band impulse generating part 120 will be described in detail below with reference to FIG. 4. FIG. 4 is a schematic diagram for explaining a method of generating an impulse signal for transmitting at the wide band impulse generating part 120. The left side of the figure shows a case of generating an impulse signal having a narrower pulse width (the parking support mode), meanwhile, the right side of the figure shows a case of generating an impulse signal having a wider pulse width (the collision detecting mode).

The pulse width setting unit 121 is comprised of a D/A converter, for example. The pulse width setting unit 121 receives a predetermined digital value from the pulse width selecting unit 112, D/A converts the digital value, and outputs a threshold voltage 41, which is shown in FIG. 4(*a*), to the impulse generating unit 123.

The seed pulse generating unit 122, when receiving an instruction to generate a pulse from the measuring and controlling unit 181, generates a seed pulse 42 having a triangle shape as shown in FIG. 4(*a*), for example, and outputs the pulse to the impulse generating unit 123. The seed pulse generating unit 122 is configured to generate seed pulses having a constant shape at all times.

The impulse generating unit 123 compares the seed pulse 42 input from the seed pulse generating unit 122 with the threshold voltage 41 input from the pulse width setting unit 121 (FIG. 4(*a*)). The impulse generating unit 123 outputs a High signal for a period of time during which the seed pulse 42 is not lower than the threshold voltage 41, and on the other hand, outputs a Low signal for a period of time during which the seed pulse 42 is lower than the threshold voltage 41. Thus, an impulse signal 43, which has a pulse width corresponding to the period of time during which the High signal is output, is output from the impulse generating unit 123 (FIG. 4(*b*)). As shown in the left side of FIG. 4, when the threshold voltage 41 output from the pulse width setting unit 121 is high, the period of time during which the High signal is output becomes short, and then the impulse signal 43 having a narrower pulse width is generated (FIG. 4(*b*. 1)). On the other hand, as shown in the right side of FIG. 4, when the threshold voltage 41 output from the pulse width setting unit 121 is low, the period of time during which the High signal is output becomes long, and then the impulse signal 43 having a wider pulse width is generated (FIG. 4(*b*. 2)).

An example of a frequency spectrum of the impulse signal 43 generated in the impulse generating unit 123 is shown in FIG. 4(*c*). It is shown in FIG. 4(*c*) that the bandwidth is wide when the pulse width is narrow, (FIG. 4(*c*. 1)), on the other hand, the bandwidth is narrow when the pulse width is wide (FIG. 4(*c*. 2)).

The pulse Doppler transmitting and receiving part 130 receives an impulse signal from the wide band impulse generating part 120, up-converts the impulse signal using a carrier wave within a predetermined frequency band, or within a submillimeter wave band (26.5 GHz) for example, and then emits the impulse signal into a space. The emitted transmitting pulse is reflected by an object and then returned therefrom. The pulse Doppler transmitting and receiving part 130 receives the reflected pulse, and performs a quadrature phase detection for the received pulse using the carrier wave of the transmitting pulse. Thus, an I signal and a Q signal, which are orthogonal to each other, are generated and then output from the pulse Doppler transmitting and receiving part 130.

The range gate setting part 140 receives a delay time that corresponds to the range gate being measured from the measuring and controlling unit 181, and also receives a release timing of the seed pulse 42 from the seed pulse generating unit 122. Using such input data, the range gate setting part 140 outputs a range gate signal to the A/D-converting part 160, with a timing at which the delay time has elapsed since the release of the seed pulse 42. It is possible to use a seed pulse itself as the release timing of the seed pulse 42. In this case, the seed pulse is delayed by the delay time received from the measuring and controlling unit 181 at the range gate setting part 140, and the delayed pulse is output to the A/D-converting part 160 as the range gate signal.

Figure 6:
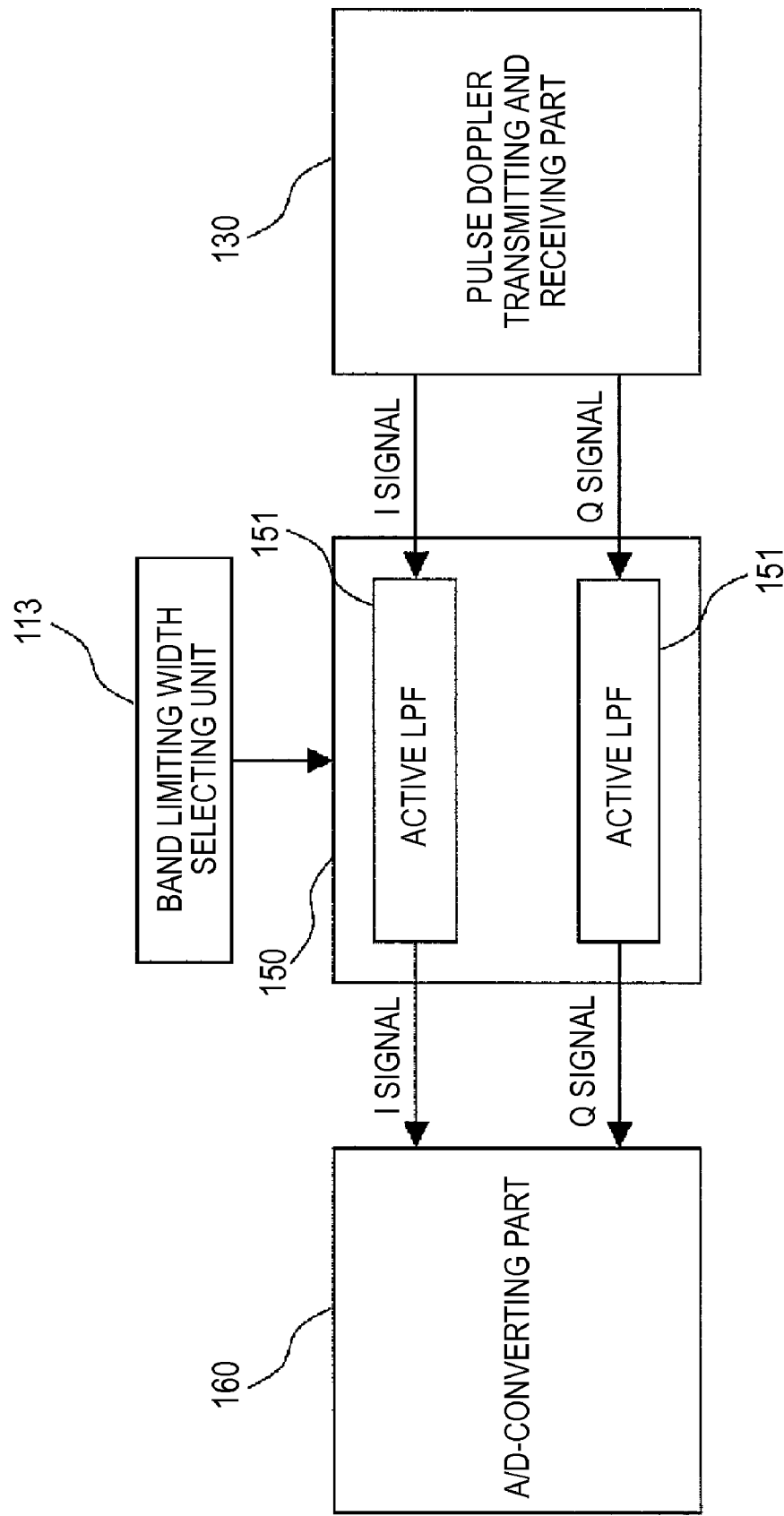
FIG. 6 is a block diagram showing a configuration of a bandwidth limiting part in the first embodiment.

The bandwidth limiting part 150 limits the passing band for the quadrature phase I and Q signals which are output from the pulse Doppler transmitting and receiving part 130, based on a band limiting width received from the band limiting width selecting unit 113. The bandwidth limiting part 150 may be configured using an active LPF as shown in FIG. 6, for example, which allows either one of the bands as shown in FIG. 4(*c*) to pass therethrough based on the band limiting width received from the band limiting width selecting unit 113.

The A/D-converting part 160 A/D-converts the I and the Q signals which are output from the bandwidth limiting part 150 with a timing at which the range gate signal is input from the range gate setting part 140. In a case where the seed pulse generated at the seed pulse generating unit 122 and delayed by the predetermined delay time is input as the range gate signal, the A/D-converting part 160 may be configured to latch the I and the Q signals for a extremely short period of rising time of the delayed seed pulse to convert the signals into digital signals.

Figure 7:
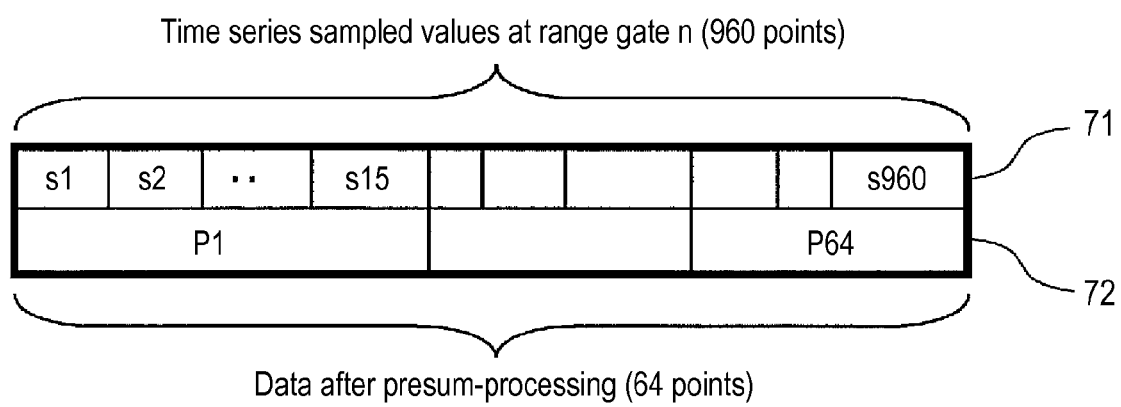
FIG. 7 is a diagram showing an example of presum-processing for one range gate.

In the presum part 170, the adding unit 171 receives the A/D-converted digital value from the A/D-converting part 160, and performs a presum-processing. A general overview of such a presum-processing will be described in detail with reference to FIG. 7. FIG. 7 is a diagram showing an example of presum-processing for one range gate. In the presum-processing, digital values si (denoted by the reference numeral 71 in FIG. 7, where i is a natural number from 1 to 960), which are input from the A/D-converting part 160, are summed up by a predetermined number of pieces to compress the data, to obtain a presum values Pj (denoted by the reference numeral 72 in FIG. 7, where j is a natural number from 1 to 64).

In the example shown in FIG. 7, 960 points of time series sampled values si (denoted by the reference numeral 71 in FIG. 7, where i is a natural number from 1 to 960) are obtained during one observing cycle for one range gate n. And then 64 points of presum values Pj (denoted by the reference numeral 72 in FIG. 7, where j is a natural number from 1 to 64) are obtained by performing the presum-processing by every 15 points of the sampled values. In the presum-processing, the adding unit 171 reads out the results of adding (or integrating) so far which have been stored in the memory 172 for the I and Q signals using the data reading unit 173, adds the digital value si which is newly input from the A/D-converting part 160 thereto, and then stores the results into the memory 172 again. When the above adding process is repeated by 15 times, the result is stored as a presum value Pj into the memory 172. Thus, by repeating such signal processing, 64 points of presum values corresponding to the range gate n are stored in the memory 172.

In the instruction executing part 180, the measuring and controlling unit 181 controls a generation of transmitting pulses and a signal processing of received pulses. Still further, the measuring and controlling unit 181, when receiving an instruction to initialize an instruction execution from the operation mode judging unit 111, interrupts the instruction execution so far, initializes the instruction execution, and then commences a signal processing in accordance with the collision detecting mode or the parking support mode, which is input from the operation mode judging unit 111. In the initialization of the instruction execution, a range gate counter n is set to one, and a pulse transmitting counter i is set to zero.

The measuring and controlling unit 181 sends out pulses by a predetermined number of times (960 times for example) for each of the range gates, and controls the signal processing of reflected pulses received. First, the measuring and controlling unit 181 outputs a delay time for determining a timing of sampling the received pulses with respect to a range gate n to the range gave setting part 140. The delay time is calculated by $2R_n/c$, where $R_n$ is a range corresponding to the range gate n. A timing at which a range gate signal is output from the range gate setting part 140 is determined based on the delay time. And using such timing, the A/D converting part 160 performs sampling (or A/D-converts) for the range gate n.

Next, the measuring and controlling unit 181 outputs an instruction to generate seed pulses to the seed pulse generating unit 122 in order for the wide band impulse generating part 120 to send out a predetermined impulse signals by a predetermined number of times for each of the range gates n. Thus, the impulse signals are output from the impulse generating unit 123, which then are up-converted to a predetermined frequency band at the pulse Doppler transmitting and receiving part 130, and sent out into a space. When transmitted signals are reflected by an object and then received at the pulse Doppler transmitting and receiving part 130, the signals are processed at the bandwidth limiting part 150, the A/D-converting part 160, and then at the presum part 170. The result of presuming is stored into the memory 172.

The measuring and controlling unit 181 performs the above mentioned signal processing for each of the range gates. When the presum values for all of the range gates are stored into the memory 172, the measuring and controlling unit 181 reads out the presum values and executes the FFT unit 182. The FFT unit 182 performs a frequency analysis for each of the range gates based on the data for which the presum-processing is performed for each of the I and the Q signals at the presum part 170. The results of the frequency analysis for all of the range gates are output to the peak detecting unit 183.

The peak detecting unit 183 judges whether an object exists or not by comparing each of the amplitude outputs of each of the range gates and the frequency gates with a predetermined threshold, and determines a range to and a relative velocity of the object based on the range gate and the frequency gate at which the object is detected, respectively.

Figure 8:
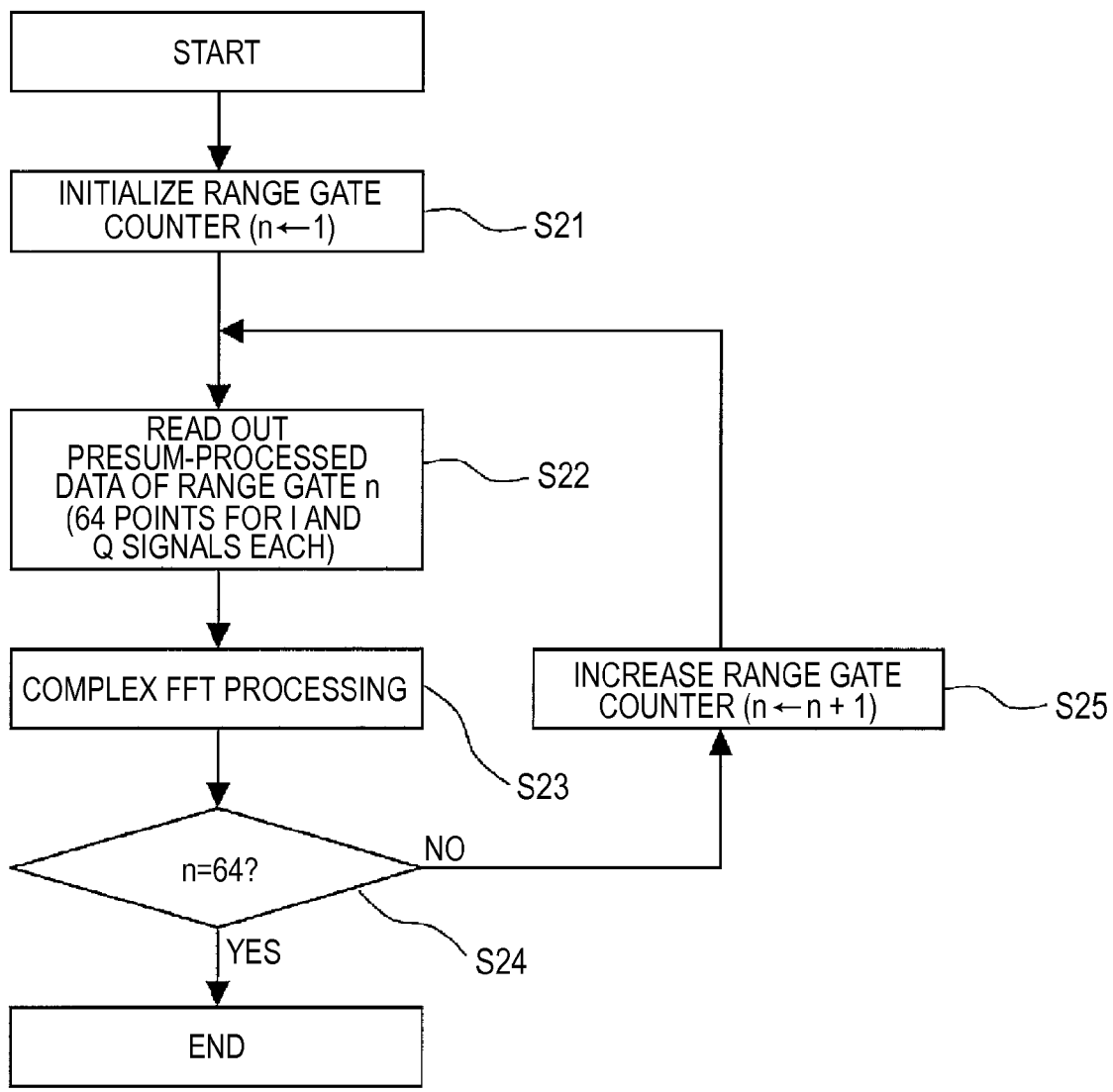
FIG. 8 is a flow chart showing a detail of an FFT processing performed at an FFT unit in the first embodiment.

The FFT processing performed at the FFT unit 182 will be described in detail below, with reference to the flow chart shown in FIG. 8. First, in the step S21, a range gate counter n is initialized. In the next step S22, the data for each channels (64 points for the I and Q signals each) corresponding to the range gate n, which have been presum-processed, is read out from the memory 172. And then in the step S23, a complex FFT processing is performed, with the data for the I signal being assumed to be as a real part and the data for the Q signal being assumed to be as an imaginary part.

In the step S24, a judgment is performed whether the FFT processing is completed or not for all of the 64 points of the range gates. If the number of the range gates for which the FFT processing has been completed is smaller than a predetermined number (i.e., 64), the range gate counter is increased by one in the step S25, and repeats the processing of the step S22 again. On the other hand, if it is judged in the step S24 that the FFT processing has been completed for all of the range gates, the FFT processing is ended.

Figure 9:
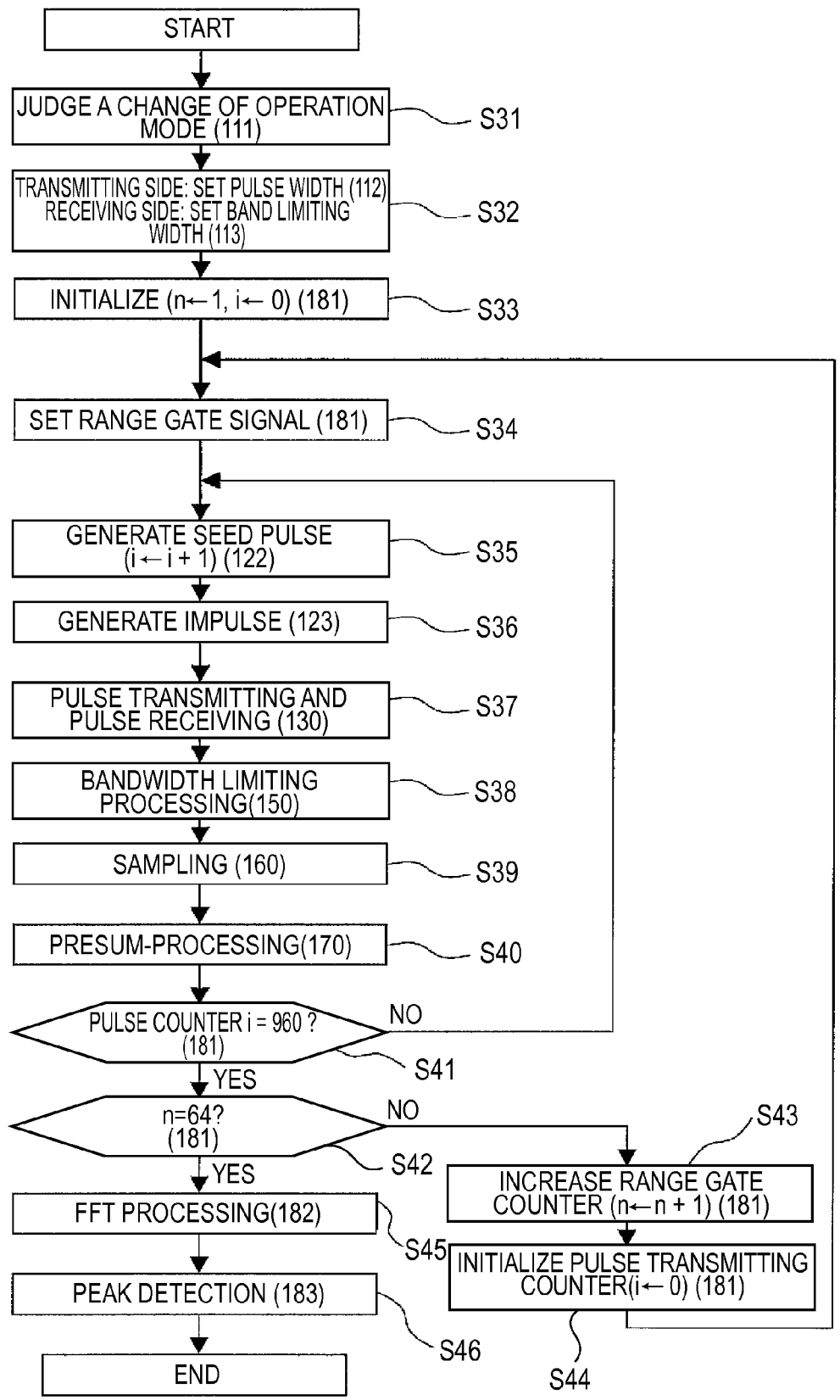
FIG. 9 is an overall flow chart showing an operation of a pulse Doppler radar device according to the first embodiment.

An operation of the pulse Doppler radar device 100 according to the present embodiment as described above will be described in detail below, with reference to an overall flow chart shown in FIG. 9. The pulse Doppler radar device 100 according to the present embodiment, when an electric power is turned on or when the operation mode judging unit 111 judges a change of an operation mode, initializes a processing of a radar measurement and starts an instruction execution. A signal processing in the case where the change of the operation mode is judged at the operation mode judging unit 111 will be described in detail below with reference to FIG. 9. Here, the numerals as referred to in the parentheses in FIG. 9 designate the reference numerals of component parts at which the signal processing is performed.

First, when the operation mode judging unit 111 judges a change of an operation mode based on a gear state (step S31), the pulse width selecting unit 112 selects a pulse width which corresponds to the operation mode, and outputs the pulse width to the pulse width setting unit 121. Moreover, the band limiting width selecting unit 113 selects a band limiting width and outputs the band limiting width to the bandwidth limiting part 150 (step S32). Further, the operation mode judging unit 111 sends an instruction to initialize to the measuring and controlling unit 181, whereby the measuring and controlling unit 181 initializes the range gate counter n and the pulse transmitting counter i (step S33).

In the step S34 through to the step S44, according to the control by the measuring and controlling unit 181, impulse signals are output by a predetermined number of times for each of the predetermined number of range gates, and then a predetermined signal processing is performed for each of the received pulses. In the following description, in accordance with the example of the presum-processing shown in FIG. 7, the number of the range gates is assumed to be 64, and the number of pulses transmitted for each range gate is assumed to be 960.

In the step S34, each of the range gates is set in order from 1 to 64 at the measuring and controlling unit 181. Furthermore, a delay time for determining a timing of sampling a received signal, which corresponds to each of the range gates n, is output to the range gate setting part 140.

Next steps S35 through to S41 are executed for each of the range gates.

First, in the step S35, the measuring and controlling unit 181 outputs an signal for instructing the seed pulse generating unit 122 to generate a seed pulse, and the pulse transmitting counter i is increased by one. Following the output of the seed pulse from the seed pulse generating unit 122, an impulse signal is output from the impulse generating unit 123 to a transmitting side of the pulse Doppler transmitting and receiving part 130 (step S36).

When the impulse signal is input to the transmitting side of the pulse Doppler transmitting and receiving part 130, the pulse Doppler transmitting and receiving part 130 emits the impulse signal outside in a predetermined frequency band. The emitted impulse signal is reflected by an object and then received by the pulse Doppler transmitting and receiving part 130 again. The pulse Doppler transmitting and receiving part 130 performs a quadrature phase detection for the received pulse signal, and then an I signal and a Q signal, which are orthogonal to each other, are output to the bandwidth limiting part 150 (step S37).

The bandwidth limiting part 150 limits a passing band of the quadrature phase I and Q signals output from the pulse Doppler transmitting and receiving part 130, based on a band limiting width set by the band limiting width selecting unit 113. The band limiting width set by the band limiting width selecting unit 113 is equivalent to the bandwidth of the impulse signal generated at the impulse generating unit 123 (step S38).

The quadrature phase I and Q signals, which have passed through the band width limiting part 150, are individually converted into the digital signals at the A/D converting part 160 at a timing with which the range gate signal is input from the range gate setting part 140, and then such digital signals are output to the presum part 170 (step S39).

The presum part 170 performs a presum-processing for the digital values which are input from the A/D converting part 160 for each of the range gates. Thus, 64 points of the presum values for each of the range gates are stored into the memory 172 (step S40).

In the step S41, the measuring and controlling unit 181 judges whether or not a predetermined number of times (960 times) of pulse transmitting are completed for the range gate n. In a case where the pulses transmitting has not been done the predetermined number of times, the measuring and controlling unit 181 returns to the step S35 again and then repeats the similar signal processing as described above. On the other hand, in a case where the pulse transmitting has been done the predetermined number of times, the measuring and controlling unit 181 proceeds to the next step S42 to judge whether or not the range gate counter has reached to the predetermined number (i.e., 64; or whether or not the signal processing has been finished for all of the range gates). And then in a case where the range gate counter has not reached to the predetermined number (i.e., in a case where some range gates have not yet been processed), the measuring and controlling unit 181 proceeds to the step S43.

In the step S43, the measuring and controlling unit 181 increases the range gate counter n by one. And then, in the next step S44, the measuring and controlling unit 181 initializes the pulse transmitting counter i to zero, thereby preparing for the signal processing for a next range gate. Thereafter, the signal processing is repeated from the step S34.

In a case where the signal processing is judged to have been finished for all of the range gates in the step S42, the FFT processing is performed by using the FFT unit 182 in the step S45. After finishing the FFT processing for all of the range gates, the peak detecting unit 183 is executed in the step S46. The peak detecting unit 183 decides a distance to an object based on the range gate in which a peak is detected, and a relative velocity of the object as well based on the frequency gate in which the peak is detected.

The pulse Doppler radar device 100 according to the first embodiment as described above is configured to automatically judge the operation mode after receiving the gear data. Accordingly, it becomes possible to scan slower with a wide band (approximately 2 GHz) within a narrower range during the period of the back gear being ON (parking support mode), for which a higher range resolution is required, while it becomes also possible to scan faster with a narrow band (approximately 0.5 GHz) within a wider range during the period of the back gear being OFF (collision detecting mode).

The Second Embodiment

A pulse Doppler radar device according to the second embodiment of the present invention is configured to use a velocity of a vehicle for judging an operation mode of the radar. The operation mode judging unit 111 receives a velocity of the vehicle, instead of the signal of the gear state used in the first embodiment, from a predetermined controlling device in the vehicle. Using the velocity of the vehicle as a judgment reference data, whether the pulse Doppler radar device 100 should be used in the parking support mode or in the collision detecting mode is judged.

As one example, the pulse Doppler radar device 100 operates in the parking support mode when the operation mode judging unit 111 judges that the velocity of the vehicle is low (not higher than 20 km/h). On the other hand, the pulse Doppler radar device 100 operates in the collision detecting mode when the operation mode judging unit 111 judges that the velocity of the vehicle is high (higher than 20 km/h). Thus, it becomes possible to set an operating condition so as for the radar to scan slow with a wide band (approximately 2 GHz) within a narrower range in the case of the vehicle running with a lower speed, while so as for the radar to scan fast with a narrow band (approximately 0.5 GHz) within a wider range in the case of vehicle running with a higher speed.

Figure 10:
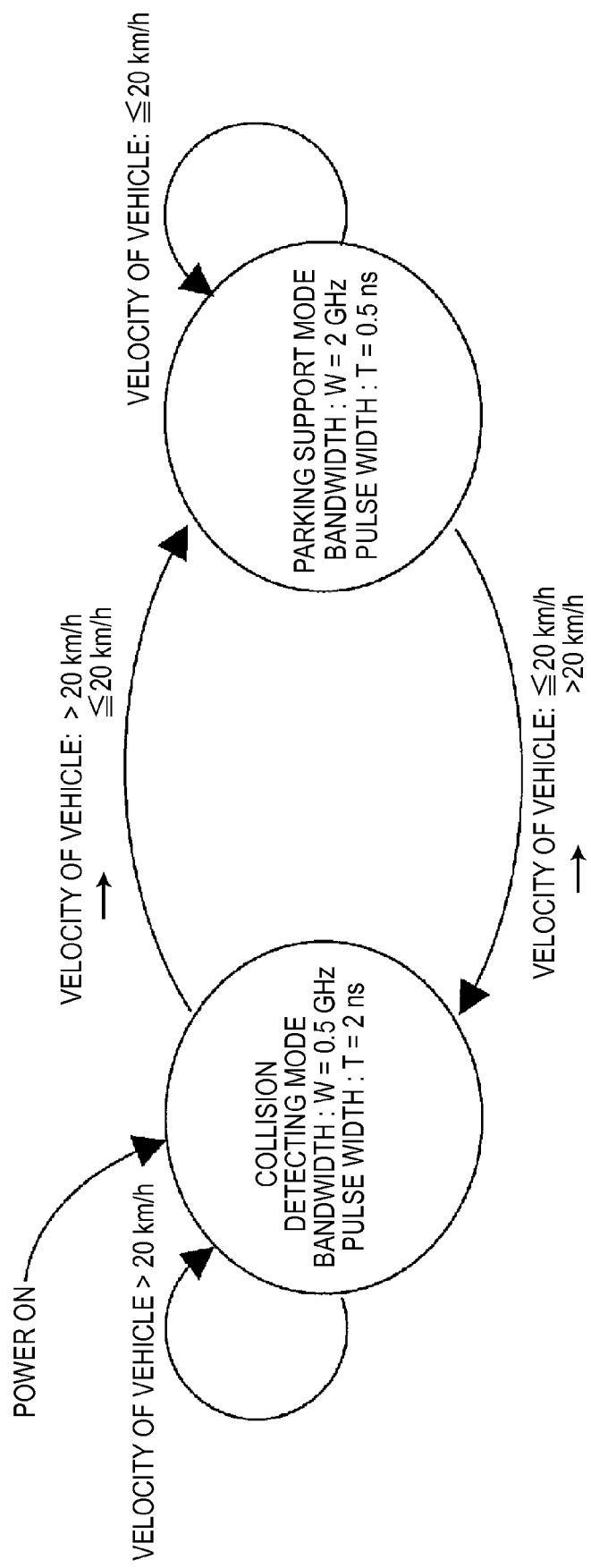
FIG. 10 is a state transition diagram explaining an operation performed at a judging and controlling part in the second embodiment.

The operation of the judging and controlling part 110 for judging an operation mode in the present embodiment will be described in detail below with reference to a state transition diagram shown in FIG. 10. According to the state transition diagram shown in FIG. 10, the parking support mode is continued during a period of time where the velocity of the vehicle is kept not higher than 20 km/h (a low speed), and the collision detecting mode is continued during a period of time where the velocity of the vehicle is kept higher than 20 km/h (a high speed). Moreover, the operation mode is switched from the parking support mode to the collision detecting mode when the velocity of the vehicle is changed from not higher than 20 km/h to higher than 20 km/h. On the contrary, the operation mode is switched from the collision detecting mode to the parking support mode when the velocity of the vehicle is slowed down from higher than 20 km/h to not higher than 20 km/h.

According to the present embodiment, when the pulse Doppler radar device 100 operates in the collision detecting mode, the bandwidth of the pulse signal is narrowed (to 0.5 GHz for example) or the pulse width is widened (to 2 ns for example) in order to lower the range resolution. On the other hand, when the pulse Doppler radar device 100 operates in the parking support mode, the bandwidth of the pulse signal is widened (to 2 GHz, for example) or the pulse width is narrowed (to 0.5 ns, for example) in order to heighten the range resolution. Thus, it becomes possible to scan slower with a wide band (approximately 2 GHz) within a narrower range when the vehicle is running with a lower speed, while it becomes also possible to scan faster with a narrow band (approximately 0.5 GHz) within a wider range when the vehicle is running with a higher speed.

The Third Embodiment

A pulse Doppler radar device according to the third embodiment of the present invention is configured to switch the operation mode depending on whether or not a large size object exists within a detecting range of the radar. That is to say, the pulse Doppler radar device normally scans fast within a wide range using a pulse signal having a narrow bandwidth (0.5 GHz for example), having a relatively low range resolution. When a large size object is detected within the detecting range of the radar, the pulse Doppler radar device starts scanning with a higher range resolution within a range before the large size object, using a pulse signal having a wider bandwidth (2 GHz for example). For the purpose of judging an existence of a large size object, for example, the instruction executing part 180 may be configured to calculate a radar cross section, using the integrated I and Q signals which are input from the presum part 170.

When a large size object (corresponding to a radar cross section of 20 dBsm, for example) exists within a detecting range of the radar, the radar may fail to detect small size objects (corresponding to a radar cross section of zero dBsm, for example) existing before the large size object, if the range resolution is low. On the contrary, the pulse Doppler radar device according to the present embodiment normally scans fast within a wide range using a pulse signal having a narrow bandwidth, having a relatively low range resolution. When a large size object is detected within the detecting range, the radar starts scanning with a higher range resolution within a limited range before the large size object by switching to a pulse signal having a wider bandwidth. Hence, it becomes possible to avoid failing to detect smaller size objects. When a large size object exists within the detecting range, there is no electromagnetic wave emitted beyond the large size object. Therefore, it is possible to reduce an interference with other systems even when a pulse signal having a wide bandwidth is used.

Figure 11:
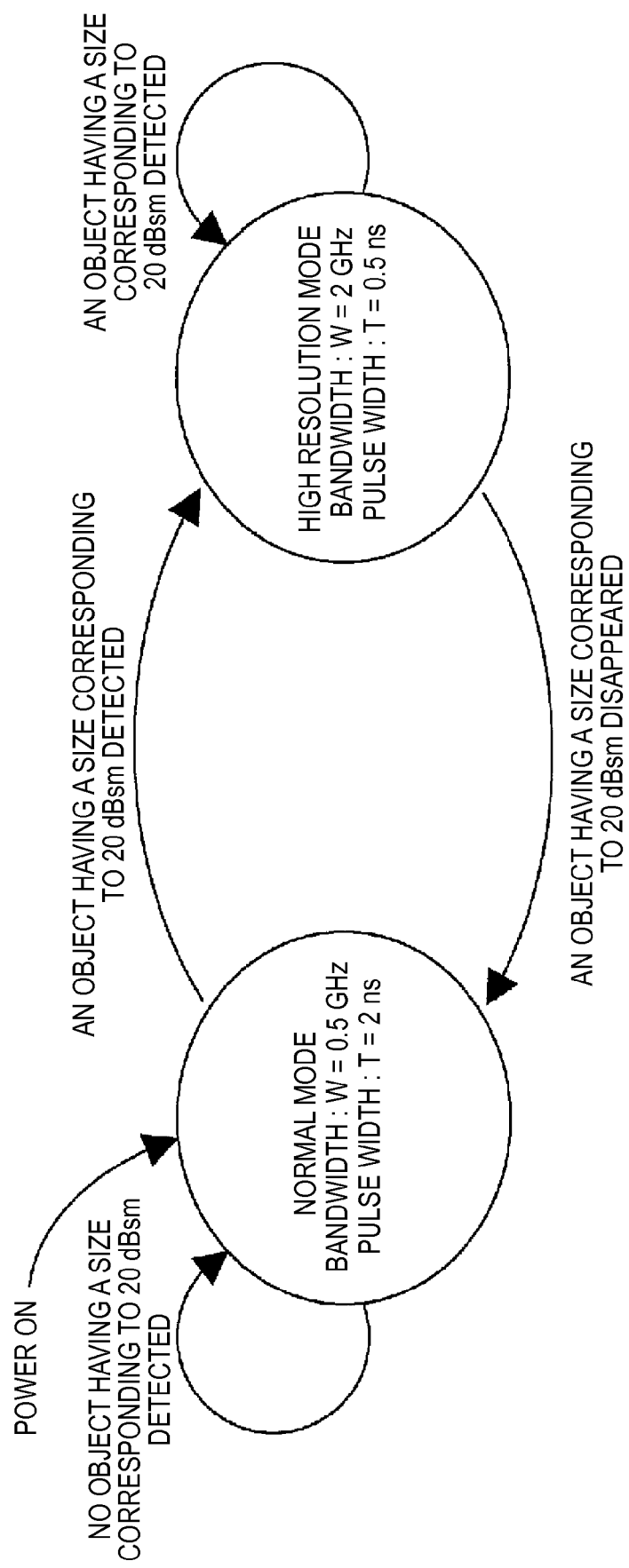
FIG. 11 is a state transition diagram explaining an operation performed at a judging and controlling part in the third embodiment.

The operation of the judging and controlling part 110 for judging an operation mode in the present embodiment will be described in detail below with reference to a state transition diagram shown in FIG. 11. According to the state transition diagram shown in FIG. 11, when a large size object (corresponding to a radar cross section of 20 dBsm, for example) does not exist within the detecting range (referred to as a normal mode hereinafter), a bandwidth of a pulse signal is narrow (0.5 GHz, for example) or the pulse width is wide (2 ns, for example) in order to have a wide measuring range. When a large size object exists within the detecting range (referred to as a high resolution mode hereinafter), the range resolution is made higher by setting the bandwidth of the pulse signal wider (2 GHz, for example) or the pulse width narrower (0.5 ns, for example) such that small size other objects (corresponding to a radar cross section of approximately zero dBsm, for example) can be detected.

When a large size object is detected in the period of operating in the normal mode, the operation mode is switched from the normal mode to the high resolution mode, and then the radar starts scanning within the narrower range with a higher resolution. Similarly, when the large size object, which has existed within the detecting range, goes out of the detecting range, the operation mode is switched from the high resolution mode to the normal mode again, and then the radar restarts fast scanning within a wider range. Thus, it becomes possible to scan without failing in detecting smaller size objects.

According to the present invention, it becomes possible to provide a pulse Doppler radar device capable of detecting within a narrow range with a high range resolution, and also detecting within a wide range quickly, by automatically judging a change of an operation mode and switching an operating condition therefor. The pulse Doppler radar device according to the present invention can support a plurality of operation modes without mounting a plurality of sensors thereon.

The description regarding the above embodiments shows one example of the pulse Doppler radar device according to the present invention, and the present invention is not limited thereto. A detailed configuration, operation, or the like of the pulse Doppler radar device according to the present embodiments can be modified properly without departing from the subject of the present invention.

Although the invention has been described with respect to the specific embodiments for complete and clear disclosure, the appended claims are not to be thus limited but are to be construed as embodying all modification and alternative construction that may occur to one skilled in the art that fairly fall within the basic teaching herein set forth.

What is claimed is:

1. A pulse Doppler radar device, comprising:
    a judging and controlling part for receiving a predetermined judgment reference data and judging an operation mode;
    a wide band impulse generating part including
        a pulse width setting unit for setting a bandwidth of a pulse to be generated based on a result of the judgment of the operation mode,
        a seed pulse generating unit for generating a seed pulse, and
        an impulse generating unit for generating a pulse having a bandwidth set by the pulse width setting unit using the seed pulse;
    a pulse Doppler transmitting and receiving part for transmitting outside the pulse generated in the wide band impulse generating part as a transmitting pulse, receiving a reflected pulse reflected by an object and returned therefrom, and outputting quadrature phase I and Q signals by performing a quadrature phase detection for the reflected pulse using a carrier wave of the transmitting pulse;
    a range gate setting part for determining a timing for sampling the quadrature phase I and Q signals based on a delay time for each of range gates from the generation of the seed pulse, and outputting a range gate signal with the timing;
    a bandwidth limiting part for receiving the quadrature phase I and Q signals from the pulse Doppler transmitting and receiving part, and limiting the quadrature phase I and Q signals within a band limiting width set based on the result of the judgment of the operation mode;
    an A/D-converting part for receiving the quadrature phase I and Q signals from the bandwidth limiting part, and A/D-converting the quadrature phase I and Q signals with the timing with which the range gate signal is input from the range gate setting part;
    a presum part for receiving a digital value for each of the A/D-converted quadrature phase I and Q signals from the A/D-converting part, and outputting integrated I and Q signals by integrating the digital values for each of the quadrature phase I and Q signals by a predetermined number of times; and
    an instruction executing part for determining the delay time for each of the range gates and outputting the delay time to the range gate setting part, receiving the integrated I and Q signals from the presum part, performing a frequency analysis for all of the range gates to calculate an amplitude output for each of the range gates and an amplitude output for each of frequency gates, judging whether there is or not an object by comparing the amplitude output for each of the range gates and the amplitude output for each of the frequency gates with a predetermined threshold, and calculating a range to and a relative velocity of the object based on the range gate and the frequency gate where the object is detected.

2. The pulse Doppler radar device according to claim 1, wherein said pulse Doppler radar device is mounted in a vehicle, and the judging and controlling part receives a gear state of the vehicle as the judgment reference data, and sets the bandwidth of the pulse and the band limiting width to a predetermined wide bandwidth in a case where the gear state is at a back gear ON state, while sets the bandwidth of the pulse and the band limiting width to a predetermined narrow bandwidth in a case where the gear state is at the back gear OFF state.

3. The pulse Doppler radar device according to claim 1, wherein said pulse Doppler radar device is mounted in a vehicle, and the judging and controlling part receives a velocity of the vehicle as the judgment reference data, and sets the bandwidth of the pulse and the band limiting width to a predetermined wide bandwidth in a case where the velocity is not greater than a predetermined threshold value of velocity, while sets the bandwidth of the pulse and the band limiting width to a predetermined narrow bandwidth in a case where the velocity is greater than the predetermined threshold value of velocity.

4. The pulse Doppler radar device according to claim 1, wherein said pulse Doppler radar device is mounted in a vehicle, the instruction executing part calculates a radar cross section using the integrated I and Q signals input from the presum part, and the judging and controlling part receives the radar cross section as the judgment reference data from the instruction executing part, and sets the bandwidth of the pulse and the band limiting width to a predetermined wide bandwidth in a case where the radar cross section is larger than a predetermined threshold value of cross section, while sets the bandwidth of the pulse and the band limiting width of the pulse to a predetermined narrow bandwidth in a case where the radar cross section is not larger than the predetermined threshold value of cross section.

* * * * *